United States Patent
Grobbel et al.

(10) Patent No.: US 7,346,967 B2
(45) Date of Patent: Mar. 25, 2008

(54) PROCESS FOR PRODUCING A FLOOR COVERING

(75) Inventors: Michael Grobbel, Schmallenberg (DE); Hubert Schauerte, Schmallenberg (DE)

(73) Assignee: HorusTec GmbH, Schmallenberg (DE)

( * ) Notice: Subject to any disclaimer, the term of this patent is extended or adjusted under 35 U.S.C. 154(b) by 678 days.

(21) Appl. No.: 10/957,783

(22) Filed: Oct. 4, 2004

(65) Prior Publication Data

US 2005/0042378 A1  Feb. 24, 2005

Related U.S. Application Data

(60) Division of application No. 09/351,608, filed on Jul. 12, 1999, now abandoned, which is a continuation of application No. PCT/EP98/00082, filed on Jan. 8, 1998.

(30) Foreign Application Priority Data

Jan. 10, 1997   (DE) ................. 197 00 660

(51) Int. Cl.
*D04H 5/02* (2006.01)
(52) U.S. Cl. .......................... 28/107; 28/109
(58) Field of Classification Search ............... 28/107, 28/109, 112, 108, 110, 111, 113, 114, 103, 28/104, 105, 163, 166; 19/145.5, 145.7, 19/144, 145, 304, 296; 156/148, 62.2, 62.4, 156/62.8; 442/383, 388, 402, 403
See application file for complete search history.

(56) References Cited

U.S. PATENT DOCUMENTS 3,010,161 A * 11/1961 Duvall ................. 264/116
3,849,223 A * 11/1974 Kent ..................... 156/148
3,856,602 A * 12/1974 Colijn et al. ........... 156/148
4,292,367 A   9/1981 Tesch
4,338,369 A   7/1982 Foenard
4,342,802 A   8/1982 Pickens, Jr. et al.
4,413,030 A   11/1983 Tesch et al.
4,481,247 A   11/1984 Tesch et al.
4,495,119 A * 1/1985 Chung ................ 264/37.28
5,145,626 A * 9/1992 Bastioli et al. ......... 264/112
5,272,000 A   12/1993 Chenoweth et al.
5,476,711 A   12/1995 Hebbard et al.

(Continued)

FOREIGN PATENT DOCUMENTS

CH   625 931 G   10/1981

(Continued)

*Primary Examiner*—A. Vanatta
(74) *Attorney, Agent, or Firm*—Laurence A. Greenberg; Werner H. Stemer; Ralph E. Locher

(57) ABSTRACT

A process is provided for producing a multi-layered flat fibrous structure, especially a floor covering, having a surface or wear layer, a base or carrier layer and optionally further layers. The base or carrier layer is first produced from a multi-layered non-woven fabric in a mechanical non-woven formation device. Elements forming the surface or wear layer are then applied to the base or carrier layer. Before application, a distribution of the elements which differ in terms of their geometrical shape is standardized in such a way that the surface or wear layer is substantially repeat-free. The elements forming the surface or wear layer are then joined at least to the base or carrier layer.

31 Claims, 4 Drawing Sheets

U.S. PATENT DOCUMENTS

| | | | |
|---|---|---|---|
| 5,554,238 A * | 9/1996 | English | 156/62.2 |
| 5,778,492 A * | 7/1998 | Thiessen et al. | 19/107 |
| 5,806,154 A * | 9/1998 | Tolbert | 28/103 |
| 5,843,554 A | 12/1998 | Katz | |
| 5,965,232 A | 10/1999 | Vinod | |
| 6,061,876 A * | 5/2000 | Rowe | 19/98 |
| 6,378,179 B1 * | 4/2002 | Hirsch | 28/103 |
| 2001/0003858 A1 * | 6/2001 | Branca | 28/107 |

FOREIGN PATENT DOCUMENTS

| | | |
|---|---|---|
| DE | 39 04 526 A1 | 8/1990 |
| DE | 44 14 479 A1 | 11/1995 |
| EP | 0 013 428 A1 | 7/1980 |
| EP | 0 053 700 A1 | 6/1982 |
| EP | 0 285 338 A2 | 10/1988 |
| FR | 2 445 866 | 8/1980 |

* cited by examiner

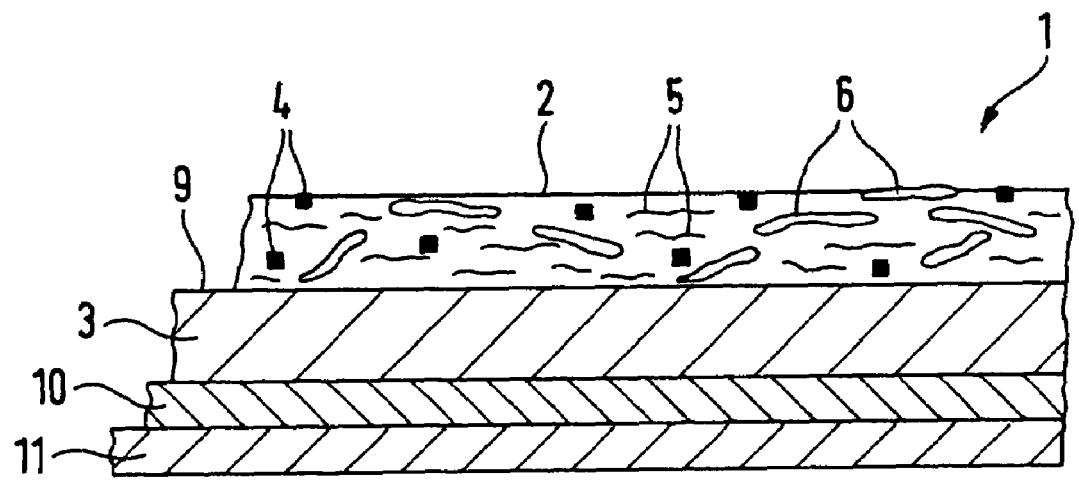
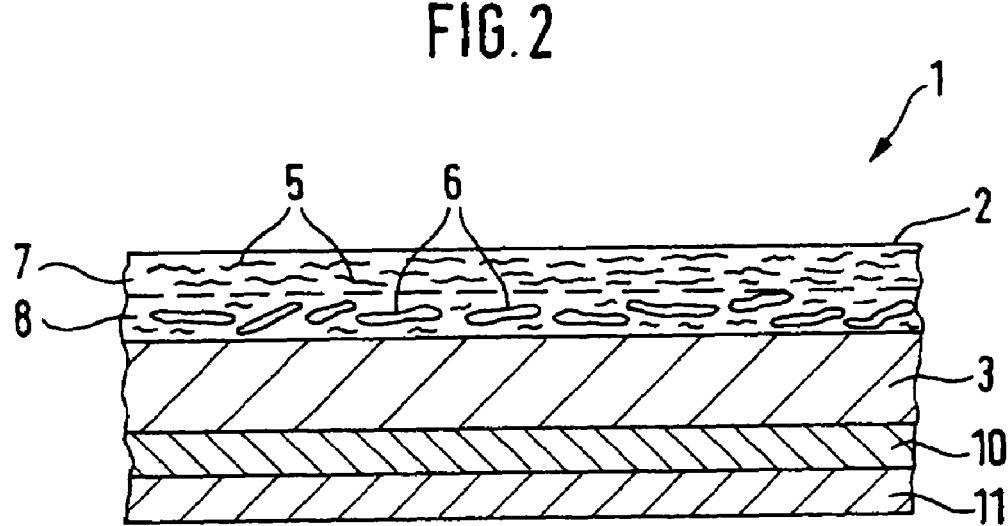

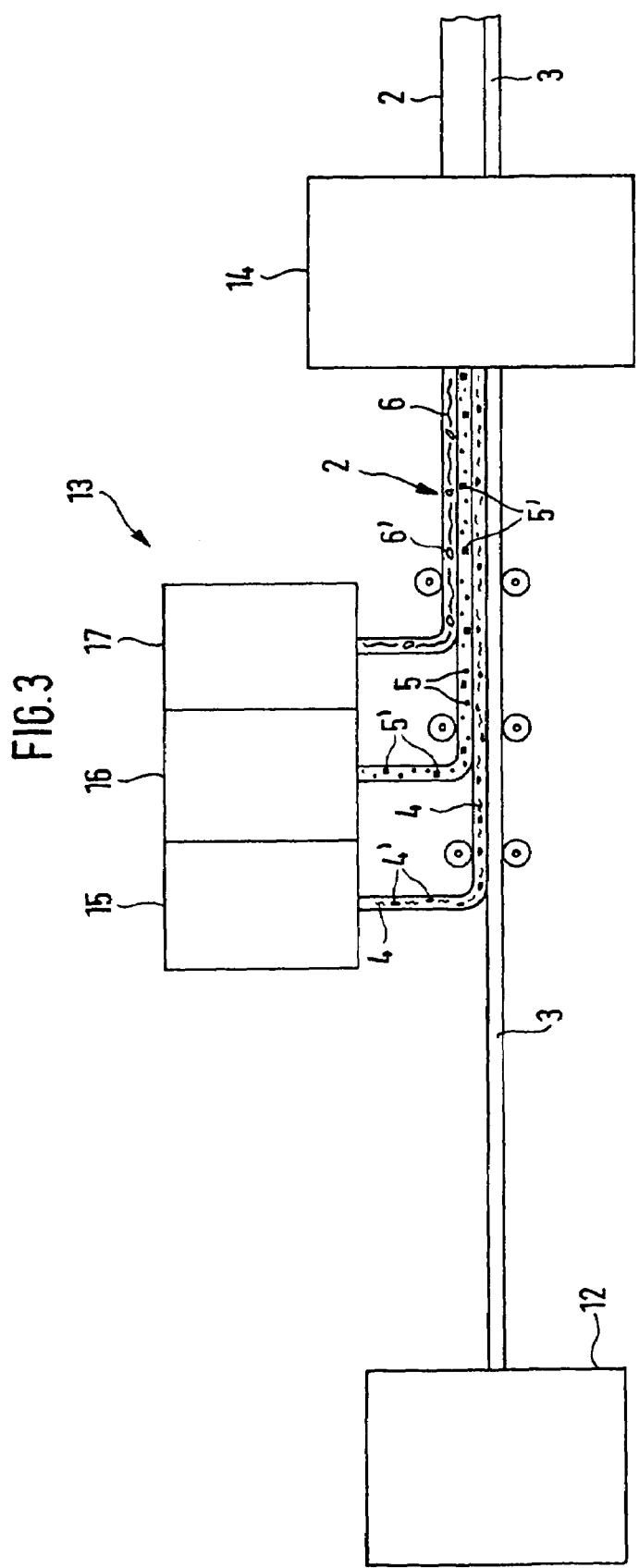

PROCESS FOR PRODUCING A FLOOR COVERING

CROSS-REFERENCE TO RELATED APPLICATION

This is a divisional application of application Ser. No. 09/351,608, filed Jul. 12, 1999 now abandoned; which was a continuing application, under 35 U.S.C. §120, of International application PCT/EP98/00082, filed Jan. 8, 1998; the application also claims the priority, under 35 U.S.C. §119, of German patent application No. 197 00 660.4, filed Jan. 10, 1997; the prior applications are herewith incorporated by reference in their entirety.

BACKGROUND OF THE INVENTION

Field of the Invention

The invention relates to a process for producing a floor covering.

Sheet-like structures, especially non-woven fabrics composed of staple fibers are produced by mechanical or aerodynamic processes.

In a mechanical carding process, starting webs or laps are formed on worsted cards. Fiber webs which are thus produced are then cross-lapped in a zigzag manner in a plurality of lap plies onto a conveyor belt moving transversely to an operating direction of the card to form cross-laid webs which are subsequently needled. That process produces sheet-like structures which are useful as wall and/or floor coverings. In order to confer higher strength and therefore better wear resistance on the webs, it is known to mechanically consolidate the non-woven web obtained in a first operation by needling in a second operation.

The aerodynamic process for producing webs makes it possible to produce coarsely needled webs. In that process, mechanically pre-opened fibers supplied to a feed unit at a uniform rate are blown by a fast air stream against a perforated rotating drum or a foraminated belt, for example. The air is sucked into the interior of the drum. The fibers remaining on the drum form a random web which is further transported by a transporter. In contradistinction to the mechanical process, that web is not plaited up in multiple plies. Nor does the non-woven fabric which is thus produced have great strength and it is usually used only for purposes that are not critically dependent on high wear resistance, for example in cushioning etc.

German Published, Non-Prosecuted Patent Application DE 39 04 526 A1 discloses a non-woven and a process for producing a non-woven which has a layered construction. The non-woven has an upper layer formed of needle felt textured on the upper surface, and a lower layer of needle felt. The lower layer is needled against the upper layer. Since the lower layer is needled against the upper layer, the relief structure of the upper layer is not destroyed. A precondition for producing such a non-woven is that the upper layer and the lower layer are present as needle felt.

European Patent 0 013 428 B1 discloses a sheet-like structure including a surface layer and a base layer composed of a non-woven. The surface layer contains fibrous structures composed of spherically intermingled fibers connected to the base layer through the use of needling fibers. Those fibrous structures are referred to as ball yarns in European Patent 0 013 428 B1. Due to the ability of the ball yarns to trickle and roll, the ball yarns can be disbursed on the surface layer. An appropriately dimensioned lay-down of a multiplicity of ball yarns in a desired predetermined configuration of the ball yarns even makes it possible to place patterns on the surface layer.

European Patent Application 0 053 700 A1 likewise discloses a sheet-like structure including a surface layer and a base layer composed of a non-woven. The surface layer is formed by relatively thick strands which are in an essentially parallel configuration, so that the sheet-like structure creates the impression of a hand-woven floor covering.

European Patent 0 013 428 B1 and European Patent Application 0 053 700 A1 disclose a sheet-like structure in which the surface layer is formed of geometric elements having a uniform shape. Those geometrically uniform elements can have different colorings, but that only changes the uniform surface structure in terms of color.

SUMMARY OF THE INVENTION

It is accordingly an object of the invention to provide a process for producing a floor covering, which overcomes the hereinafore-mentioned disadvantages of the heretofore-known processes, products and devices of this general type, wherein a sheet-like structure has a visually non-uniform surface in which a surface layer is non-repeating, or the sheet-like structure has a visually non-uniform surface on a surface layer which is non-repeating and wherein the plant produces a sheet-like structure having a non-repeating, visually non-uniform surface layer in a simple and economical manner.

With the foregoing and other objects in view there is provided, in accordance with the invention, a process for producing a floor covering, which comprises introducing at least two differing groups of elements with geometrically differing shapes into an applicator, equalizing the groups in the applicator, and depositing the elements in an application stream of the groups for at least partly forming a substantially non-repeating visible surface layer; and needling at least the elements forming the surface layer to a non-woven base layer.

In the novel process for producing a sheet-like structure, especially a non-woven, formed by a surface layer and a base layer composed of a non-woven, at least some of the elements which differ geometrically with regard to their shape and which at least partly form the surface layer are introduced into an applicator. Elements having different spatial forms are meant by elements having a geometrically different shape. The elements in question can be of cylindrical shape, block shape or other shape. The geometrically differing elements are equalized in the application device so that an essentially uniform distribution of the elements is present. The elements are applied to the base layer in an equalized application stream. In a further step, the elements applied to the base layer are unified at least with a base layer.

The process of the invention makes it possible to produce a sheet-like structure having a visually non-uniform surface on the surface layer where the surface layer is non-repeating. The visually non-uniform surface is provided by the geometrically differing elements, and these elements may additionally have different colors. The non-repeating nature of the surface layer is advantageous with regard to any mass production of a sheet-like structure, since the process of the invention provides for the reproducible manufacture of a sheet-like structure.

In accordance with another mode of the invention, the geometrically differing elements are introduced into the applicator in accordance with at least one predetermined mixing ratio. These elements are equalized in the applicator with regard to their distribution in such a way as to make it possible to produce an essentially non-repeating surface layer.

In accordance with a further mode of the invention, in order to set the basis weight of the surface layer or of the elements which form the surface layer, the elements are densified in at least one section of an exit from the applicator to form the application stream. The elements are preferably densified in a funnel-shaped section of the exit duct.

In accordance with an added mode of the invention, the equalized elements are metered into the densifying section of the exit duct.

In accordance with an additional mode of the invention, the elements which form the surface layer are laid, scattered and/or blown onto the base layer. The process of applying the elements to the base layer may also include combinations of the individual application operations. The elements may also be applied in succession, in which case, for example, initially some of the elements are laid onto the base layer and thereafter further elements are scattered onto the base layer supporting the laid elements.

As mentioned above, the geometrically differing elements form at least two differing groups which are supplied to the applicator and equalized therein in such a way that the different elements of the two groups applied in an application stream form an essentially non-repeating surface layer. It is also possible to use several groups of geometrically differing elements. This process option makes it possible to style the surface layer differently with regard to its visual effect. The individual elements may also have different structures and/or colors.

In accordance with yet another mode of the invention, at least some of the elements are formed by dividing a feed material. The elements may be referred to as confetti-like elements. Preferably, the elements are punched out of the feed material or formed by cutting the feed material.

In accordance with yet a further mode of the invention, the feed material is in ribbon or sheet form. A feed material in ribbon form is to be understood as also encompassing feed materials which do not necessarily have a rectangular cross section. The cross section of the material in ribbon form may also be circular. Further polygonal cross sections are possible for the material in ribbon form. For example, the feed material in ribbon form may have a hexagonal or octagonal cross section.

In accordance with yet an added mode of the invention, in order to simplify the dividing of a feed material, a material in sheet form is divided initially in the longitudinal direction and then essentially at right angles to the longitudinal direction of the feed material. The dividing of the feed material can be effected in at least two successive dividing stations. The dividing stations may have an appropriate cutting device, especially rotary cutting instruments.

The elements produced by dissecting the material in sheet form have an essentially rectangular cross section. If other cross sections are desired, they are obtainable by having the blades of the cutting instruments disposed at an angle to each other. A corresponding result may also be obtained through the configuration of punching tools. The punching tools may have a honeycomb-like structure, for example. Elements producible through the use of punching tools include elements having a circular cross section.

In accordance with yet an additional mode of the invention, in order to ensure that the elements are reliably bonded to the base layer, the feed material and the elements are each from 3 to 10 mm in thickness. The feed material is preferably a non-woven, especially a needle felt produced by the conventional processes for producing a needle felt. It is proposed that the feed material have a basis weight between 200 and 1000 gr/m$^2$.

In accordance with again another feature of the invention, at least a portion of the elements and/or the feed material is formed by yarns and/or threads. The elements are preferably spun or carded products having different dimensions, structures and/or colors.

In accordance with again an added mode of the invention, some of the elements are yarn precursors, especially condenser-spun or carded slivers. The yarn precursors proposed for use as elements for forming the surface layer preferably have a metric count of about 0.5 to 4.0 (about 2000 to 250 tex).

In accordance with again an additional mode of the invention, instead of yarn precursors it is also possible to apply condenser-spun or carded yarns to the base layer as elements for forming the surface layer. The condenser-spun or carded yarns preferably have a metric count between about 0.5 and 5.0 (about 2000 to 200 tex).

In accordance with still another mode of the invention, at least some of the elements are formed by condenser-spun or carded threads. The condenser-spun or carded threads preferably have a metric count between about 0.5/3 to 5.0/3 (about 6000 to 600 tex).

In accordance with still a further mode of the invention, the surface structure of the surface layer is formed by semi-worsted yarns and/or threads. The semi-worsted yarns preferably have a metric count between about 2.0 and 8.0 (about 500 to 125 tex). The semi-worsted threads preferably have a metric count between about 2/2 and 8/2 (about 1000 tex and 250 tex).

In accordance with still an added mode of the invention, the visual and structural appearance of the surface layer can also be influenced as a result of at least a portion the elements being formed by textile pieces, especially wovens or non-wovens.

In addition to the surface styling influenced by the combination of spun or carded products and needle felt, a suitable choice of the elements of the surface layer is another way to produce a non-woven which has particular strength and is suitable for use in the contract sector, i.e., in offices, hotels, restaurants, taverns, workrooms, sporting arenas, etc. In accordance with still an additional mode of the invention, the elements are formed of natural and/or synthetic structural materials.

The coloring of the surface layer can be influenced by the elements being used. For instance, it is possible to use printable or dyeable yarns, especially BCF yarns. The visual, structural and haptic impression conferred by a surface layer is also influenced by the dimensioning of the elements. It is therefore proposed according to the invention that the elements be appropriately Comminuted prior to being applied to the base layer. The elements preferably are about 20 to 120 mm in length.

The elements forming the surface layer are preferably unified with the base layer by needling. In accordance with another mode of the invention, the elements forming the surface layer are applied to an unconsolidated base layer. During the needling of the elements forming the surface layer it is also possible for the unconsolidated base layer to be consolidated by needling. This version of the process on one hand unifies the surface layer with the base layer and on the other hand consolidates the base layer itself, and thereby provides a simplified way of producing the sheet-like structure.

In accordance with a further mode of the invention, in order to increase the strength of the non-woven, the non-woven is consolidated by chemical binders in an additional process step.

In accordance with an added mode of the invention, the base layer is provided with at least one further layer on a surface which is remote from the surface layer.

The at least one further layer provides product stability, fire resistance, conductivity or the like. The further layer may, for example, be a spun-bonded backing composed of flame retardant polypropylene. The backing on the non-woven may also be an additional layer of PES. If the non-woven is constructed as tile material, an additional, heavy-duty backing of bitumen, APO or the like may be applied.

After the surface layer has been joined to the base layer, the non-woven can be subjected to at least one treatment. The non-woven can be given a finishing treatment by full-bath impregnation, padding or one-sided coating followed by drying and heat-setting in the temperature range from 120 to 160° C.

The sheet-like structure which is thus produced, especially a non-woven, is useful as sheet and tile material and as wall covering. It is also usable as a piece-dyed floor covering.

With the objects of the invention in view, there is also provided a floor covering, comprising a base layer formed of a non-woven; and a visible, substantially non-repeating surface layer formed by a multiplicity of elements having different geometric shapes, the elements formed of at least one material selected from the group consisting of yarns, threads, yarn precursors, carded slivers, carded yarns, lifting yarns and needle-felt-like elements, and the elements applied and needled at least to the base layer.

The elements differing with regard to their geometric shape provide a surface layer surface having a structured look. The non-repeating surface layer also makes it possible to use sheet-like structures to cover large areas, for example as a floor covering, without creating a visually non-uniform area.

The base layer preferably includes a needled non-woven made of polyester fibers, including low flammability polyester fibers, polyester bicomponent fibers, polyproyplene fibers, polyamide fibers or polyethylene films.

In accordance with another feature of the invention, the sheet-like structure is notable for the elements which form the surface layer being applied to an unconsolidated base layer, and the unconsolidated base layer being consolidated during needling of the surface layer elements to the base layer.

In accordance with a further feature of the invention, the surface layer is formed by at least two plies of elements. The individual elements can be in the form of elongate structures, tufts, nodes or knots. As a result of the surface layer being formed by at least two plies of elements, it is possible to create a high-low structure, so that the surface of the surface layer makes a three-dimensional impression.

The elements may also have different colors, whereby the visual appearance of the surface of the surface layer can be appropriately varied.

In accordance with an added feature of the invention, at least some of the elements have fibers which are oriented in a preferred direction. The elements can be needle-felt-like in construction. The needle-felt-like elements preferably have a basis weight between 200 and 1000 gr/m$^2$.

The elements may have a non-spherical shape.

In accordance with an additional feature of the invention, at least some of the elements are formed by yarns and/or threads. When yarns or threads are used as elements, they have a length of about 3 to 120 mm, preferably 3 to 10 mm.

In accordance with yet another feature of the invention, when the elements are yarn precursors, they have in particular a metric count of about 0.5 to 4.0.

In accordance with yet a further feature of the invention, the elements may also be formed by condenser-spun or carded slivers or by condenser-spun or carded yarns and/or by condenser-spun or carded threads. Alternatively or additionally, the elements may be formed by semi-worsted yarns.

With the objects of the invention in view, there is additionally provided a plant for producing a floor covering, comprising an applicator including at least one application station; a housing defining a space and having an upper wall; at least one supply duct ending in the space in the vicinity of the upper wall; a metering device disposed in the at least one supply duct; an equalizing unit disposed in said space; and an exit duct having a metering unit disposed therein and having at least one section in the form of a densifying shaft for applying geometrically different elements onto a surface of a base layer to form a substantially non-repeating surface layer; and at least one needling device for needling the surface layer to the base layer.

The supply duct carries the elements which differ with regard to their geometric shape into the applicator. The metering device provides quantitative metering of the elements. The equalizing unit homogenizes the elements with regard to their distribution. The quantity of elements which is thus homogenized is discharged from the space through the exit duct and these elements are applied to the base layer.

The metering unit is provided in the exit duct in order to provide a metered supply of the homogenized quantity of elements to the base layer. This also makes it possible to set the basis weight for the base layer. The densifying shaft can also be used for setting the basis weight of the elements.

In accordance with another feature of the invention, the applicator is an aerodynamic scattering device.

In accordance with a further feature of the invention, the exit duct has at least one vibrating section in order to ensure that the elements in the exit duct are transported to the point of exit from the duct. The vibration of the section can also be used for densifying the application stream of the elements, so that this is another way of setting the basis weight of the surface layer.

In accordance with an added feature of the invention, in order to set the basis weight, the exit duct is constructed in one section in such a way that its cross section is changeable.

In accordance with an additional feature of the invention, the exit duct of the plant has a section formed by at least two endless driven belts. The belts are disposed spaced apart from and opposite to each other. The belts form a transportation line in which the homogenized quantity of elements is transported to the exit orifice. The speed of the belts is adjustable. Preferably, the speed of each belt is independently adjustable, so that different influences can be exerted on the elements in the transportation line.

In accordance with yet another feature of the invention, the exit duct is disposed essentially vertically.

In accordance with a concomitant feature of the invention, there is provided at least one mixing device in communication with the applicator. The at least one mixing device premixes the elements. A plurality of consecutive or parallel mixing devices are advantageous in certain circumstances.

Other features which are considered as characteristic for the invention are set forth in the appended claims.

Although the invention is illustrated and described herein as embodied in a process for producing a floor covering, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, cross-sectional view of a first illustrative embodiment of a sheet-like structure;

FIG. 2 is a view similar to FIG. 1, showing a second illustrative embodiment of a sheet-like structure;

FIG. 3 is a fragmentary, side-elevational view of a plant for carrying out a process of the invention;

DESCRIPTION OF THE PREFERRED EMBODIMENTS

Figure 4:
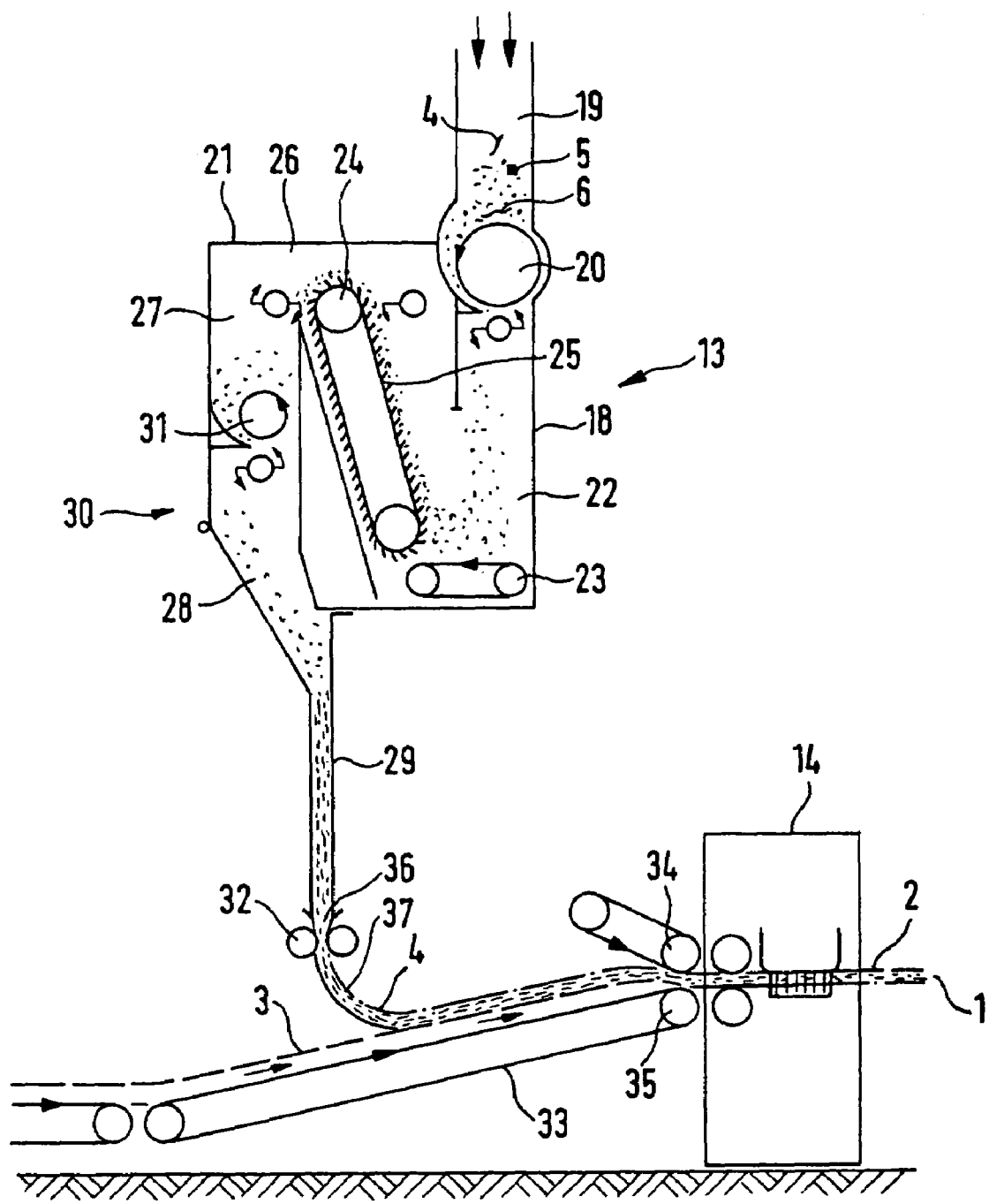
FIG. 4 is a fragmentary, side-elevational view of an applicator of a plant.

Referring now to the figures of the drawings in detail and first, particularly, to FIG. 1 thereof, there is seen a diagrammatic representation of a first illustrative embodiment of a sheet-like structure 1. The structure has a multilayered construction. A base layer 3, produced from a multi-ply non-woven in a mechanical web formation apparatus, supports a surface layer or wear layer 2. The surface layer 2 is formed by elements 4, 5, 6 that are unified with the base layer 3 by needling.

In the illustrated embodiment, the surface layer 2 is formed by the three elements 4, 5, 6 which differ in geometric shape. The elements 4 are constructed in the form of knots or nodes.

The elements 5 are fibrous. The elements 6 are formed by a yarn. This combination of the different elements 4, 5, 6 is presented as an example. Different compositions of the elements 4, 5, 6 can be used to create different effects in the appearance of the surface layer 2. It is not necessary for all of the elements 4, 5, 6 to be applied to the base layer 3 simultaneously. The elements 4, 5, 6 can be applied in successive steps.

In the illustrated embodiment of FIG. 1, the structure 1 has two further layers 10, 11 formed on a surface 9 of the base layer 3 which is remote from the surface layer 2. The layer 10 is a spun-bonded backing of flame retardant polypropylene. The layer 11, which is constructed on top of the layer 10, is a spun-bonded backing composed of PES. The layer 11 forms a backing for the non-woven structure 1. The structure 1 can be used as a floor covering.

FIG. 2 illustrates a further embodiment of a sheet-like structure 1. The structure 1 has a multilayered construction. A base layer 3 supports a surface layer 2. The surface layer 2 is joined to the base layer 3 by needling. The surface layer 2 is formed by elements 5, 6. The elements 6 form a first ply 8 adjacent the base layer 3. The elements 5 form a second ply 7 on top of the first ply 8. In the production of the non-woven structure 1, the elements 6 were the first to be applied to the base layer 3. The elements 6 have larger dimensions than the elements 5. The elements 5 were subsequently applied to the first ply or layer 8, so that they also partly end up in the ply or layer 8. The elements 5 can have been blown onto the ply or layer 8. FIG. 2 shows a preferred illustrative embodiment of a structure 1. The plies 7, 8 can also be constructed through the use of elements 5, 6 having similar geometric dimensions. However, the surface texture and/or color of the elements 5, 6 should be different, making it possible to obtain an appealing visual effect for the surface layer 2.

The structure 1 of FIG. 2 also has layers 10 and 11, which are superposed, with the layer 10 being joined to the base layer 3.

A visible surface of the surface layer 2 is essentially non-repeating. The individual plies contain elements 4, 5, 6 which differ in geometric shape.

FIG. 3 is a diagrammatic illustration of a plant, especially for carrying out a process for producing a sheet-like structure. The plant includes a mechanical web formation apparatus 12 in which a base layer 3 is produced from a multiply non-woven. The base layer 3 has elements applied on top of it forming a surface layer 2.

The elements are applied through the use of an applicator 13. The applicator 13 shown in FIG. 3 includes three application stations wherein elements 4, 4', 5, 5' and 6, 6' are respectively applied ply-wise to the base layer 3. The elements 4, 4', 5, 5' and 6, 6' preferably have different geometric shapes. The base layer 3 is formed of an unconsolidated non-woven and supports the elements 4, 4', 5, 5' and 6, 6' which are applied ply-wise to the base layer 3. The base layer 3 is subsequently supplied to a needling device 14 where the elements forming the surface layer 2 are needled at least to the base layer 3.

For example, an application station 15 can place a first mixture including elements 4 and 4' on the base layer 2. An application station 16 scatters a second mixture including the elements 5 and 5' on the base layer 2 supporting the elements 4. An application station 17 blows a third mixture including the elements 6 and 6' onto the base layer 3 supporting the elements 4, 4' and 5, 5'.

The number of application stations and the manner in which the elements forming the surface layer are applied is dependent on the desired effect or the properties of the surface layer. For instance, a plurality of elements 4, 5 and 6 can be applied to the base layer 3 through the use of a single application station.

The needling device 14 needles the elements forming the surface layer to the base layer 3. The needling device can include a plurality of needle looms. Further treatment steps can take place between the individual needling operations.

FIG. 4 illustrates a part of a plant for producing a sheet-like structure including a surface layer and a base layer. The plant includes an application device 13 in which elements 4, 5, 6 that form a surface layer 2 are applied to a base layer 3 which is diagrammatically indicated in FIG. 4. The applicator 13 has a housing 18 with one supply duct 19.

The supply duct 19 supplies the applicator with the elements 4, 5, 6 which differ geometrically with regard to shape. A metering device 20 is disposed inside the supply duct 19 for quantitatively metering the elements.

The supply duct and the metering device are constructed in the vicinity of an upper wall 21 of the housing 18. The elements 4, 5, 6 free-fall through the supply duct 19 and the metering device 20 into a space 22 defined by the housing 18.

The space 22 is a location for disbursing and making the supplied elements 4, 5, 6 uniform. To this end, a transportation unit 23 is provided within the housing 18 for conveying the elements 4, 5, 6 to an equalizing device 24.

The equalizing device 24 includes an endless comb-like belt 25. The elements are conveyed by the equalizing device 24 to a passageway 26 constructed in the vicinity of the upper wall 21.

During the transportation of the elements into the vicinity of the passageway 26, the elements are partly knocked off the endless comb-like belt 25 through the use of non-illustrated knockoff rolls, so that the elements arrive at a lower position of the comb-like belt 25 or fall back onto the transportation unit 23. This has the effect of providing a uniformity of the disbursement of the elements having differing geometric shapes.

The elements 4, 5, 6 which are conveyed by the comb-like belt 25 pass through the passageway 26 into a first section 27 of an essentially vertical exit duct 30. The first section 27 is provided with a metering unit 31 on the inside.

The elements 4, 5, 6 pass through the metering unit 31 into a second section 28 of the exit duct 30. The second section 28 is essentially funnel-shaped in construction and it ends in a third section 29 of the exit duct 30. The third section 29 is essentially constructed in the form of a densifier shaft. A discharge unit 32 is disposed ahead of a mouth 36 of the third section 29, for discharging the elements 4, 5, 6 onto the base layer 3.

The section 29 of the exit duct 30 is preferably constructed in such a way that it vibrates, so that the elements 4, 5 and 6 are densified by the vibration and form an application stream 37.

The layered structure 1 including the base layer 3 and the surface layer 2 is transported by a transportation unit 33 to the needling device 14. The surface layer 2 and the base layer 3 pass between vertically aligned rolls 34, 35, upstream of the needling device 14. The needling device 14 needles the elements 4 forming the surface layer 2 to the base layer 3.

Figure 5:
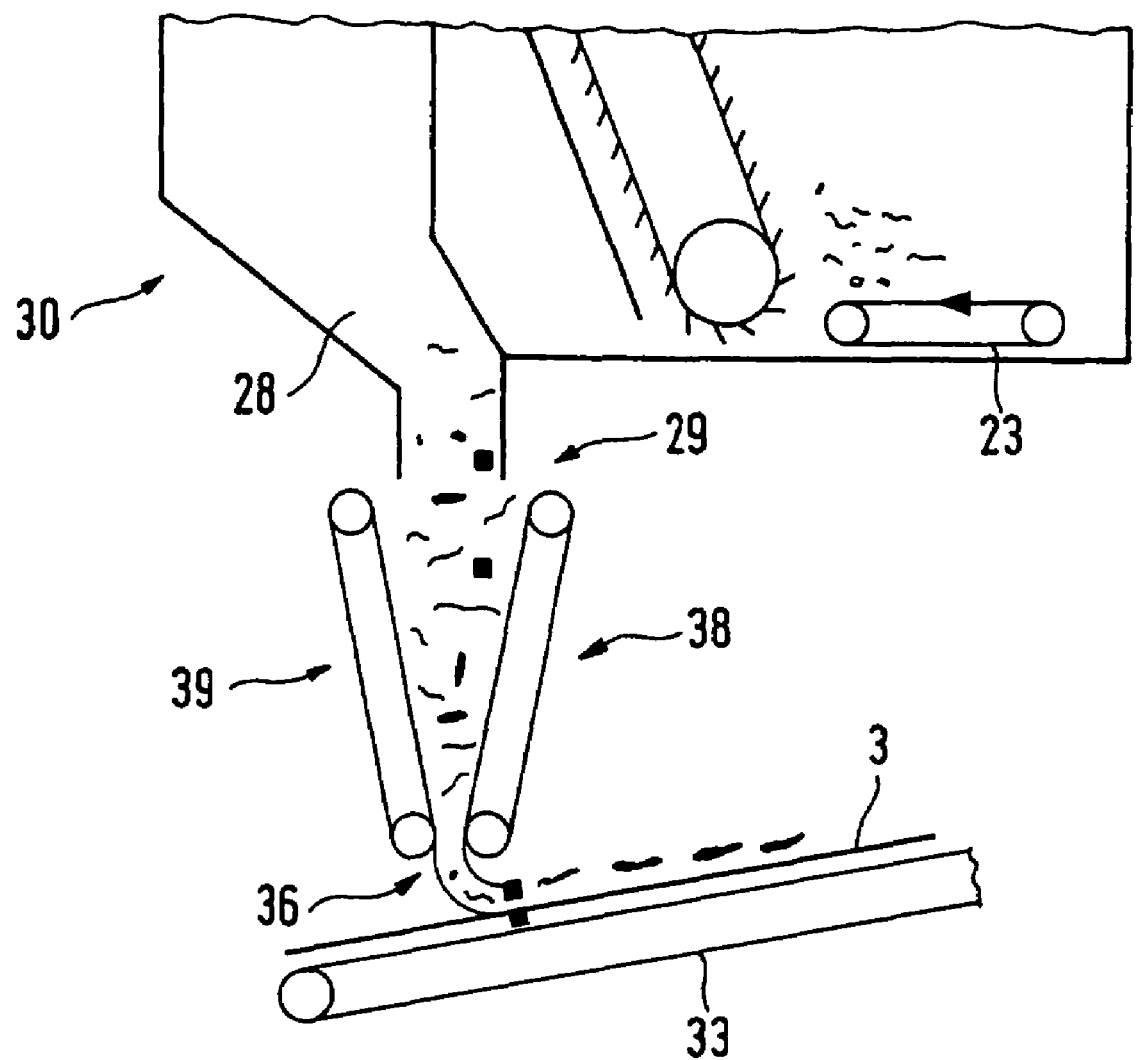
FIG. 5 is a fragmentary, side-elevational view of an exit duct with a transportation line.

FIG. 5 diagrammatically illustrates a section 29 of an exit duct 30. The section 29 is formed by two spaced apart belts 38, 39. The belts 38, 39 are opposite each other. The elements 4, 5 and 6 are transported to a mouth 36 between the belts which travel in the same direction. The belts 38, 39 are driveable through the use of non-illustrated drive units. The speed of each belt 38, 39 can be set independently. The belts 38, 39 are preferably disposed in such a way that the distance between them decreases in the direction towards the mouth 36. The belts 38, 39 form a transportation line within which the elements 4, 5 and 6 are densified.

The belts 38, 39 may perform a pendulum movement to achieve better pre-densification of the material being transported, namely the elements 4, 5, 6.

We claim:

1. A process for producing a floor covering, which comprises:
   a) introducing at least two differing groups of elements with geometrically differing shapes into an applicator, equalizing the groups in the applicator, and depositing the elements in an application stream of the groups for at least partly forming a substantially non-repeating visible surface layer; and
   b) needling at least the elements forming the surface layer to a non-woven base layer.

2. The process according to claim 1, which comprises carrying out the step of introducing the elements into the applicator in accordance with at least one predetermined mixing ratio.

3. The process according to claim 1, which comprises densifying the elements in at least one section of an exit duct of the applicator to form the application stream.

4. The process according to claim 3, which comprises carrying out the densifying step in a funnel-shaped section of the exit duct.

5. The process according to claim 3, which comprises metering the elements into the section densifying the elements.

6. The process according to claim 1, which comprises at least one of laying, scattering and blowing the elements of the application stream onto the base layer.

7. The process according to claim 1, which comprises forming at least some of the elements by dividing a feed material.

8. The process according to claim 7, which comprises punching the elements out of the feed material.

9. The process according to claim 7, which comprises cutting the elements to form the feed material.

10. The process according to claim 1, which comprises forming at least some of the elements by dividing a feed material in ribbon or sheet form.

11. The process according to claim 1, which comprises forming at least some of the elements by initially dividing a feed material in sheet form in longitudinal direction and then essentially at right angles to the longitudinal direction of the feed material.

12. The process according to claim 1, which comprises forming at least some of the elements by dividing a feed material having a thickness of from 3 to 10 mm.

13. The process according to claim 1, which comprises forming at least some of the elements by dividing a feed material selected from the group consisting of a non-woven and a needle felt.

14. The process according to claim 1, which comprises forming at least some of the elements by dividing a feed material selected from the group consisting of a non-woven and a needle felt having a basis weight between 200 and 1000 gr/m$^2$.

15. The process according to claim 7, which comprises forming at least a portion of at least one of the elements and the feed material from at least one of yarns and threads.

16. The process according to claim 15, which comprises forming at least a portion of the elements from yarn precursors.

17. The process according to claim 16, which comprises forming at least a portion of the elements from card slivers.

18. The process according to claim 16, which comprises forming at least a portion of the elements from yarn precursors having a metric count of about 0.5 to 4.0.

19. The process according to claim 15, which comprises forming at least a portion of the elements from carded yarns having a metric count between about 0.5 and 5.0.

20. The process according to claim 15, which comprises forming at least a portion of the elements from carded threads.

21. The process according to claim 20, which comprises forming at least a portion of the elements from carded threads having a metric count between about 0.5/3 and 5.0/3.

22. The process according to claim 15, which comprises forming at least a portion of the elements from semi-worsted yarns having a metric count between about 2.0 and 8.0.

23. The process according to claim 15, which comprises forming at least a portion of the elements from semi-worsted threads.

24. The process according to claim 15, which comprises forming at least a portion of the elements from semi-worsted threads having a metric count between about 2/2 and 8/2.

25. The process according to claim 1, which comprises forming at least a portion of the elements from textile pieces.

26. The process according to claim 1, which comprises forming at least a portion of the elements from woven pieces.

27. The process according to claim 1, which comprises forming the elements from at least one of natural and synthetic materials.

28. The process according to claim 1, wherein the base layer to which the elements forming the surface layer are applied, is an unconsolidated base layer.

29. The process according to claim 28, which comprises consolidating the unconsolidated base layer during the step of needling the elements to the base layer.

30. The process according to claim 1, which comprises consolidating at least one of the base layer and the surface layer by chemical binders.

31. The process according to claim 1, which comprises providing at least one further layer on a surface of the base layer remote from the surface layer.

* * * * *